United States Patent [19]
Kim

[11] Patent Number: 6,034,665
[45] Date of Patent: Mar. 7, 2000

[54] METHOD OF ADJUSTING COLOR OF A VIDEO DISPLAY APPARATUS

[75] Inventor: Yong-Hee Kim, Kyungki-do, Rep. of Korea

[73] Assignee: SamSung Electronics Co., Ltd., Kyungki-do, Rep. of Korea

[21] Appl. No.: 08/898,322

[22] Filed: Jul. 22, 1997

[30] Foreign Application Priority Data

Jul. 22, 1996 [KR]  Rep. of Korea ............... 96-29624

[51] Int. Cl.$^7$ ......................................... G09G 5/02
[52] U.S. Cl. ............................... 345/150; 345/431
[58] Field of Search ............................ 345/150, 153, 345/431, 154; 348/646, 645; 358/28

[56] References Cited

U.S. PATENT DOCUMENTS

| | | | |
|---|---|---|---|
| 4,562,460 | 12/1985 | Harwood | 358/28 |
| 4,788,586 | 11/1988 | Eckenbrecht | 358/28 |
| 4,819,077 | 4/1989 | Kikuchi et al. | 358/98 |
| 5,134,465 | 7/1992 | Ohki et al. | 358/27 |
| 5,231,504 | 7/1993 | Magee | 358/75 |
| 5,276,505 | 1/1994 | Jeong | 358/22 |
| 5,282,021 | 1/1994 | Bachmann et al. | 358/28 |
| 5,355,225 | 10/1994 | Bachmann et al. | 348/645 |
| 5,436,673 | 7/1995 | Bachmann et al. | 348/645 |
| 5,452,017 | 9/1995 | Hickman | 348/646 |
| 5,452,018 | 9/1995 | Capitant et al. | 348/651 |
| 5,479,189 | 12/1995 | Chesavage | 345/154 |
| 5,504,538 | 4/1996 | Tsujihara et al. | 348/673 |
| 5,521,615 | 5/1996 | Boyan | 345/150 |
| 5,539,540 | 7/1996 | Spaulding et al. | 358/518 |
| 5,544,284 | 8/1996 | Allebach et al. | 395/131 |
| 5,631,749 | 5/1997 | Ueda | 358/520 |
| 5,650,942 | 7/1997 | Granger | 364/526 |
| 5,867,169 | 2/1999 | Prater | 345/431 |

*Primary Examiner*—Amare Mengistu
*Assistant Examiner*—Vanel Frenel
*Attorney, Agent, or Firm*—Robert E. Bushnell, Esq.

[57] ABSTRACT

In a color adjustment method for a video display apparatus, the display apparatus is initialized and a mean luminance value L is calculated from a maximum luminance value and a minimum luminance value of the display apparatus when powered up. The hue and saturation data, which are received in accordance with a keypress, are transformed into RGB control data by hue and saturation conversions. The saturation data denotes a distance from a white point on an X-Y chromaticity coordinate system of the display apparatus to a chromaticness point on the chromaticity coordinate system, and the hue data denotes an angle made by a first line connecting a red point on the coordinate system and the white point with a second line connecting the white point and the chromaticness point. Finally, the gains and DC biases of the RGB video signals are controlled on the basis of the RGB control data. Thus, a user can easily and variously control the color of a video display apparatus by hue and saturation keys for color adjustment, without the help of one skilled in the art.

14 Claims, 8 Drawing Sheets

METHOD OF ADJUSTING COLOR OF A VIDEO DISPLAY APPARATUS

CLAIM OF PRIORITY

This application makes reference to, incorporates the same herein, and claims all benefits accruing under 35 U.S.C. §119 from an application for *METHOD FOR ADJUSTING COLOR OF A VIDEO DISPLAY APPARATUS* earlier filed in the Korean Industrial Property Office on the $22^{nd}$ day of July 1996 and there duly assigned Serial No. 29624/1996, a copy of which application is annexed hereto.

BACKGROUND OF THE INVENTION

1. Field of the Invention

The present invention relates to a method of adjusting the color of a video display apparatus, more particularly to a method of adjusting the color of a video display apparatus, such as a color cathode ray tube (CRT) display monitor, by using hue and saturation conversions.

2. Description of the Related Art

For video display apparatuses, such as color CRT display monitors for personal computer systems, several adjustment keys for controlling their various functions have been provided.

In a color CRT display apparatus, the color adjustment thereof may be carried out by controlling the gains and DC bias (or cut-off) voltages of R (red), G (green) and B (blue) video signals. However, it is nearly impossible for a user to control the color of the display apparatus since the gains and DC bias voltages of the RGB video signals for its color adjustment are fixedly set to predetermined values during its manufacturing processes. Also, in the prior art, the gains and DC bias voltages of the RGB video signals may be uniformly altered in accordance with a keypress of a key for adjusting contrast or brightness. In order to adjust the color of the display apparatus in various ways, thus, the user may ask one skilled in the art for help.

The following patents each disclose features in common with the present invention but do not teach or suggest the specific method of adjusting color of a video display apparatus of the present invention: U.S. Pat. No. 5,355,225 to Bachmann et al., entitled *Video Signal Olor Correction With Digital Function Memories And Color Window*, U.S. Pat. No. 5,452,018 to Capitant et al., entitled *Digital Color Correction System Having Gross And Fine Adjustment Modes*, U.S. Pat. No. 4,819,077 to Kikuchi et al., entitled *Color Image Processing System*, U.S. Pat. No. 5,134,465 to Ohki et al., entitled *Color Detecting Circuit*, U.S. Pat. No. 5,176,505 to Jeong, entitled *Method And Apparatus For Editing Image Colors In Color Television System*, U.S. Pat. No. 5,282,021 to Bachmann et al., entitled *Video Hue Correction Taking Account Of Saturation And Luminance*, U.S. Pat. No. 4,788,586 to Eckenbrecht, entitled *Controller For Adjusting Color Hue And Saturation Of Images Generated From Signals In a Non-Broadcasting Video System*, U.S. Pat. No. 5,436,673 to Bachmann et al., entitled *Video Signal Color Correction Based On Color Hue*, U.S. Pat. No. 4,562,460 to Harwood, entitled *Manual Hue Control As For A Digital TV*, U.S. Pat. No. 5,452,017 to Hickmann, entitled *Method And Apparatus For Electronic Image Color Modification Using Hue And Saturation Levels*, U.S. Pat. No. 5,521,615 to Boyna, entitled *Display System For Instruments*, and U.S. Pat. No. 5,631,749 to Ueda, entitled *Color Image Signal Processing Device*.

SUMMARY OF THE INVENTION

It is therefore an object of the present invention to provide a method of adjusting the color of a video display apparatus, in which a user can easily and variously control the color of the apparatus by varying hue and saturation.

In order to attain the above object, according to an aspect of the present invention, there is provided a method of adjusting the color of a video display apparatus for displaying an image by means of RGB video signals from a host, comprising the steps of: calculating a mean luminance value from a maximum luminance value and a minimum luminance value of the display apparatus; receiving hue and saturation data generated in accordance with a keypress associated with hue and saturation adjustments, wherein the saturation data denotes a distance from a white point on an X-Y chromaticity coordinate system of the display apparatus to a chromaticness point on the chromaticity coordinate system, and the hue data denotes an angle made by a first line connecting a red point on the chromaticity coordinate system and the white point with a second line connecting the white point and the chromaticness point; transforming the hue and saturation data into RGB control data by hue and saturation conversions; and controlling gains and DC biases of the RGB video signals on the basis of the RGB control data.

According to another aspect of the invention, there is provided a method of adjusting the color of a video display apparatus having a CRT; keys for several adjustment functions thereof; a video pre-amplifier for amplifying RGB video signals from a host in association with contrast and brightness, on the basis voltage levels of RGB gain control signals; a video main amplifier for amplifying output signals of the video pre-amplifier according to predetermined voltage gains; a gun driver for receiving output signals of the video main amplifier and controlling DC levels of the received signals on the basis of voltage levels of RGB bias control signals so as to generate RGB driving signals which drive RGB electron guns of the CRT, respectively; and a microcontroller for controlling the voltage levels of the RGB gain and bias control signals on the basis of key-input data generated when the keys are pressed; the method comprising the steps of: initializing the video display apparatus; detecting a keypress; determining whether or not a pressed key is a hue/saturation adjustment key; performing a function corresponding to the pressed key when the pressed key is not the hue/saturation adjustment key; displaying a menu for color adjustment on a screen of the CRT when the pressed key is the hue/saturation adjustment key; receiving hue and saturation data and generated in accordance with the keypress of the hue/saturation adjustment key; transforming the hue and saturation data Hue and Sat into RGB control data by hue and saturation conversions; and controlling the voltage levels of the RGB gain and bias control signals on the basis of the RGB control data.

According to the color adjustment methods of the present invention, a user can easily and variously control the color of a video display apparatus without the help of one skilled in the art.

The foregoing features and advantage of the present invention will be more fully described in the accompanying drawings.

BRIEF DESCRIPTION OF THE DRAWINGS

A preferred embodiment of the invention will be described in detail with reference to the following figures wherein.

DESCRIPTION OF THE PREFERRED EMBODIMENT

Figure 4:
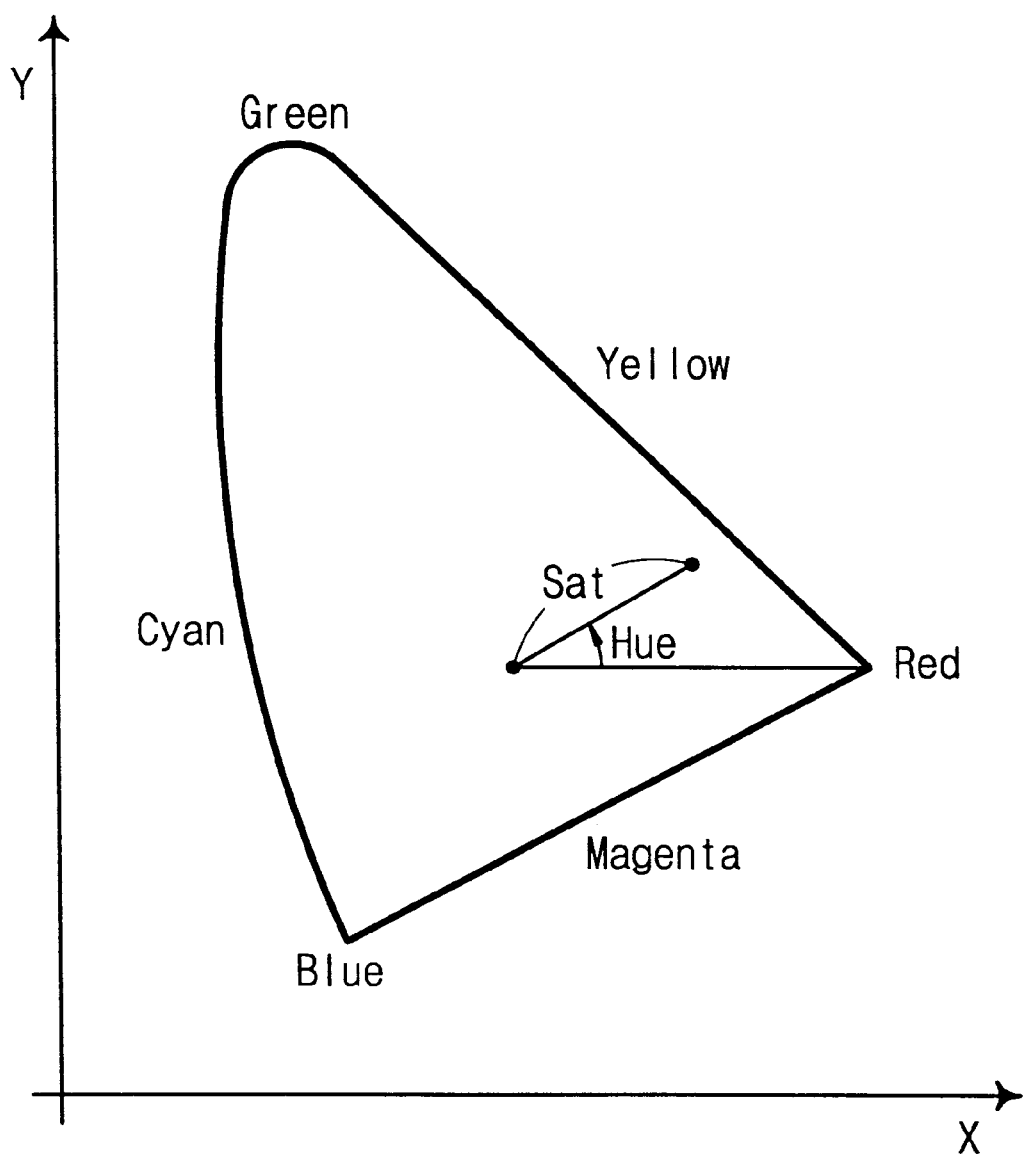
FIG. 4 is a diagram showing the relationship between hue and saturation on an X-Y chromaticity coordinate system for a CRT.
Figure 5:
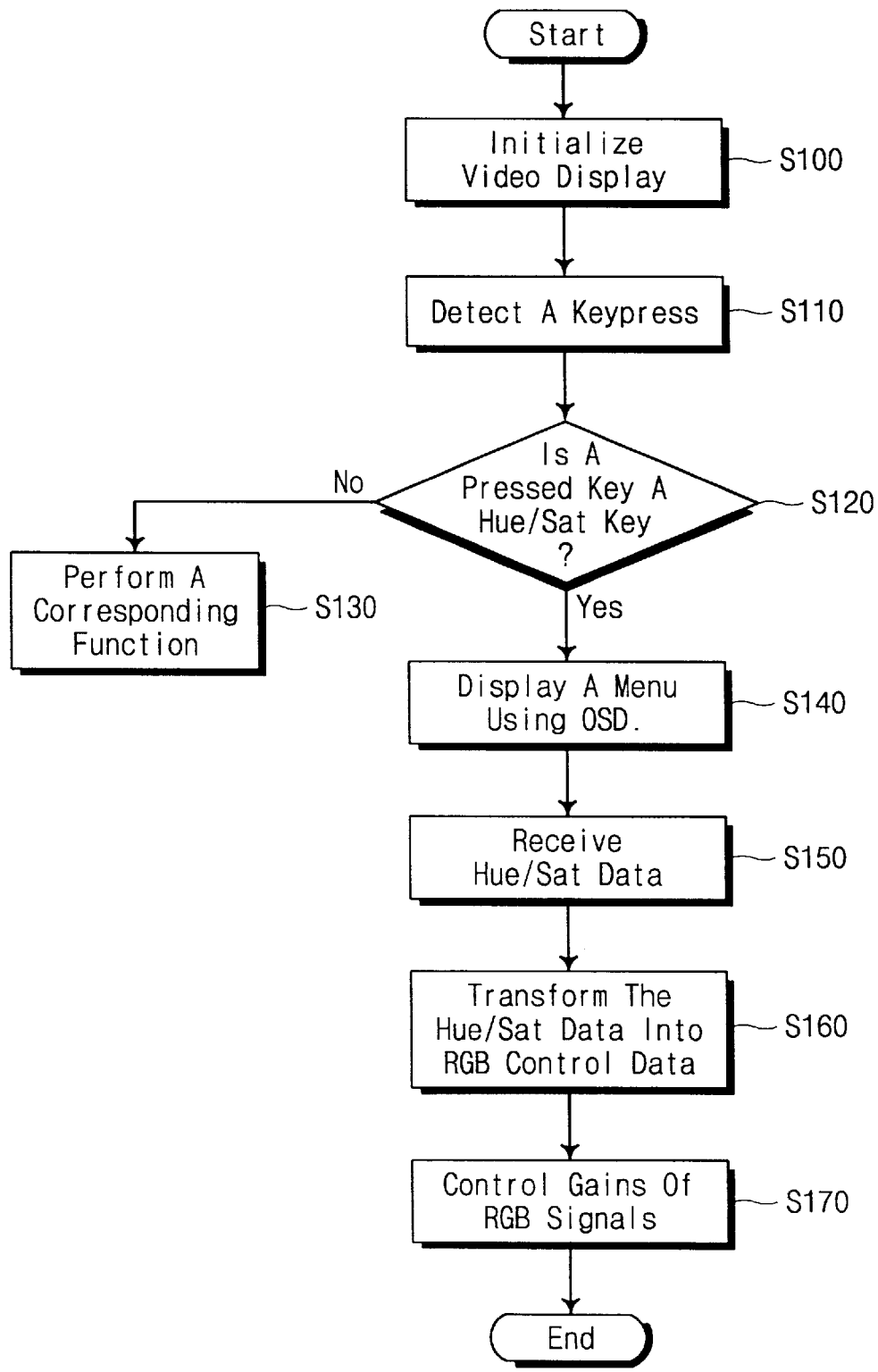
FIG. 5 is a flowchart illustrating a novel method of adjusting the color of a video display apparatus in accordance with a preferred embodiment of the present invention.

Referring to FIG. 5, in accordance with a novel color adjustment method for a video display apparatus, firstly, the display apparatus is initialized and a mean luminance value L is calculated from a maximum luminance value $MAX_L$ and a minimum luminance value $MIN_L$ of the display apparatus when it is powered up (step S100). The hue and saturation data Hue and Sat, which received in accordance with a keypress, are transformed into RGB control data Red, Green and Blue by means of hue and saturation conversions (step S160). By definition, saturation means the degree of purity of a color, as measured by its freedom from a mixture with white (i.e., chromaticness or colorfulness of an area judged in proportion to its brightness), and hue denotes the attribute of a visual perception that can be described by chromatic color names such as red, yellow, orange, etc (i.e., the distinctive characteristics of a given color that enable it to be assigned a position in the spectrum). Herein, referring to FIG. 4, the saturation data Sat denote a distance from a white point on an X-Y chromaticity coordinate system of the display apparatus to a chromaticness (or colorfulness) point on the chromaticity coordinate system, and the hue data Hue denote an angle made by a first line connecting a red point on the chromaticity coordinate systems and the white point with a second line connecting the white point and the chromaticness point. In the end, the gains and DC biases of the RGB video signals are controlled on the basis of the RGB control data Red, Green and Blue (step S170). Thus, a user can easily and variously control the color of a video display apparatus by means of hue and saturation keys for color adjustment, without the help of one skilled in the art.

Figure 1:
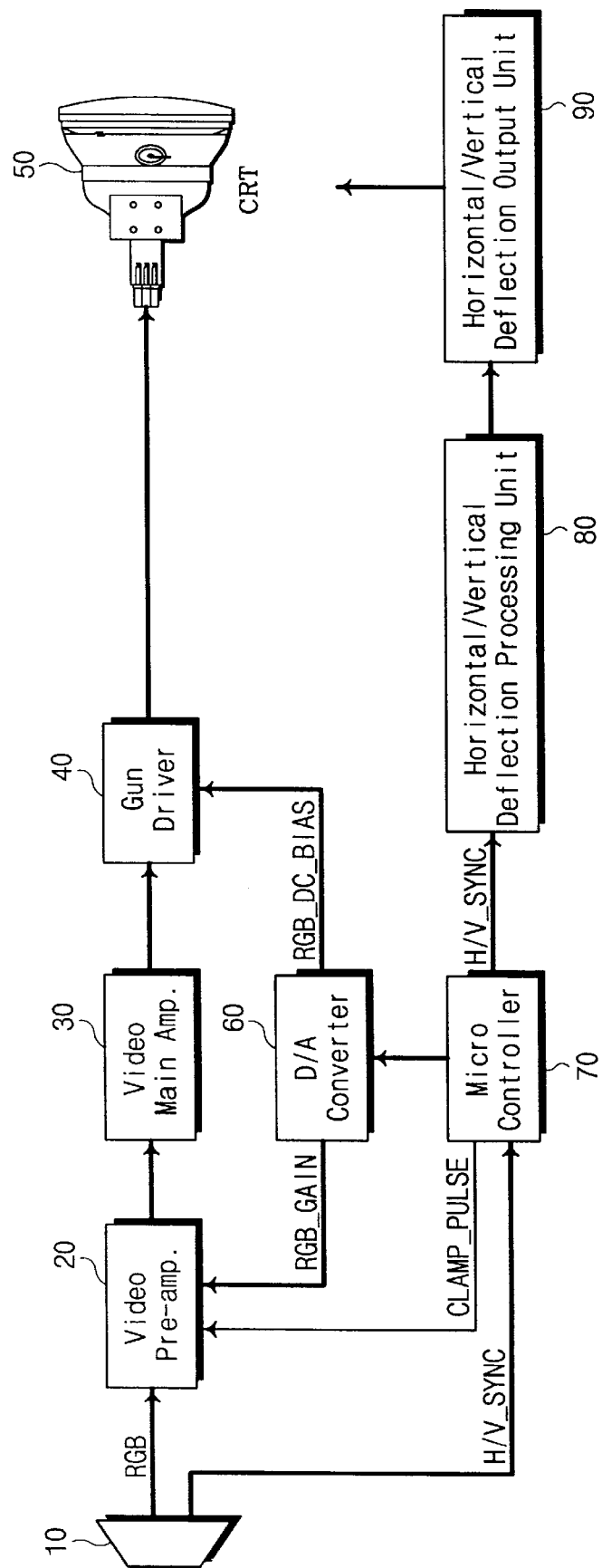
FIG. 1 is a block diagram of a CRT display apparatus.

FIG. 1 is a block diagram of a color CRT display apparatus. Referring to FIG. 1, the display apparatus has a cathode ray tube (CRT) 50, adjustment keys (not shown) for adjusting several functions thereof, and a microprocessor 70 for running the whole gamut of apparatus control.

The horizontal and vertical synchronizing signals H_SYNC and V_SYNC, which are supplied from a host through a connector 10 such as a D-sub connector, are input to the microcontroller 70. The microcontroller 70 generates a video control data signal and a clamp pulse signal CLAMP_PULSE in response to the horizontal and vertical synchronizing signals and keyinput data from adjustment keys. Also, the microcontroller 70 checks whether or not the frequencies of the synchronizing signals H_SYNC and V_SYNC provided from the host belong to limited ranges, respectively. The microcontroller 70 periodically checks the frequency variations of the synchronization signals H_SYNC and V_SYNC every predetermined duration. If the frequencies of the synchronization signals H_SYNC and V_SYNC are changed and the changed frequencies are over the limited ranges, the microcontroller 70 cuts off the synchronization signals H_SYNC and V_SYNC.

A video pre-amplifier 20 amplifies RGB video signals from a host, such as a personal computer, through the connector 10. The RGB video signals are amplified in a range of from 4 to 6 volts, on the basis of voltage levels of RGB gain control signals RGB_GAIN from a digital-to-analog (D/A) converter 60 and a clamp pulse signal CLAMP_PULSE from the microcontroller 70, resulting in a DC restoration of the video signals and a clamping in black levels. The voltage levels of the RGB gain control signals depend on the gain control data value from the microcontroller 70, which generates several control signals and data in response to keyinput data entered from adjustment keys.

A video main amplifier 30 receives and amplifies the output signals of the video pre-amplifier 20. The output signals of the video pre-amplifier 20 are amplified in a range from 40 to 60 volts. That is, the video main amplifier 30 has a voltage gain of about 10. A gun driver 40 receives the output signals of the video main amplifier 30 and generates RGB driving signals by which RGB electron guns of the CRT 50 are respectively driven. In the gun driver 40, the DC levels of the video signals received from the video main amplifier 30 is adjusted on the basis of voltage levels of RGB bias control signals RGB_DC_BIAS from the D/A converter 60 so that the level-controlled video signals are supplied to the guns of the CRT 50, as the RGB driving signals.

Figure 2:
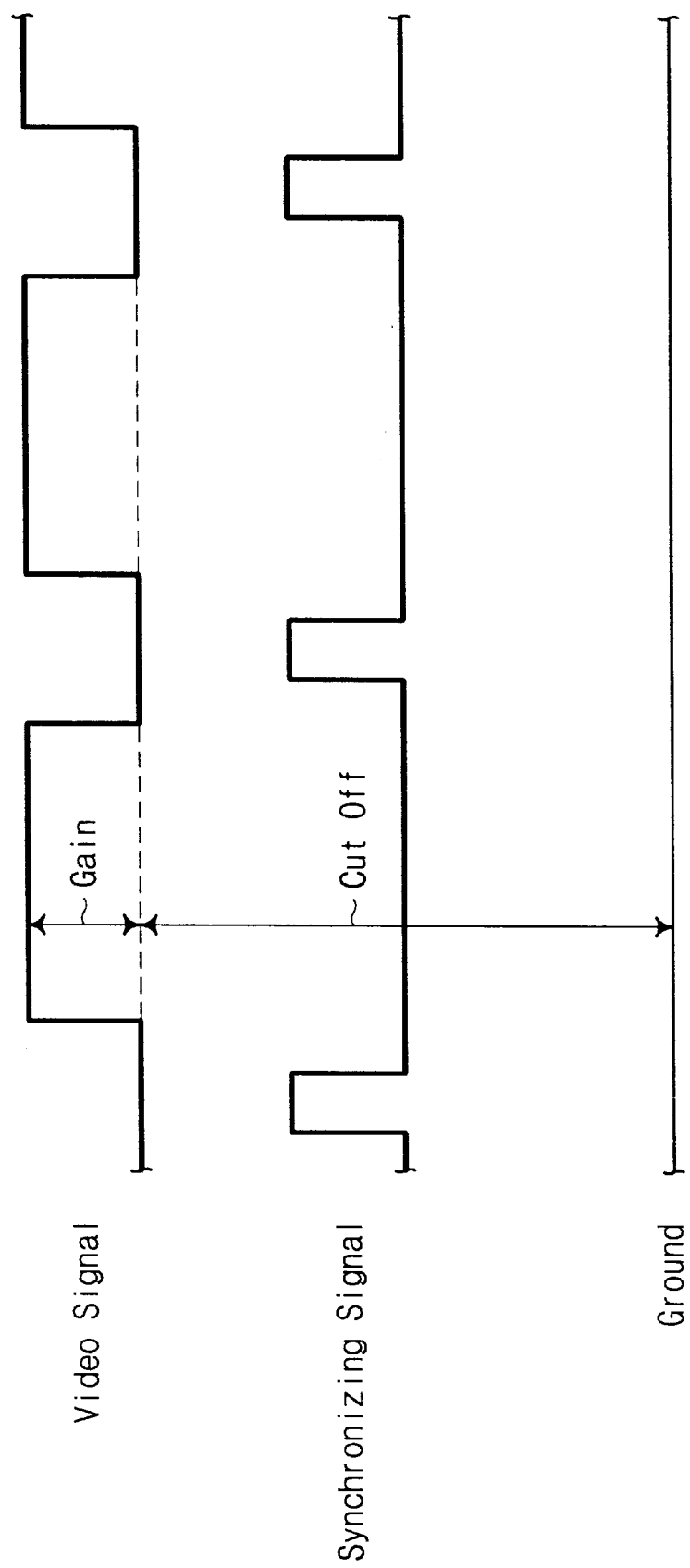
FIG. 2 shows a waveform of a video signal compared to that of a horizontal synchronizing signal.

Referring to FIG. 2, there is shown a waveform of a video signal compared to that of a horizontal synchronizing signal. As immediately described above, the gain voltages and cut-off voltages (i.e., DC bias voltages) of the RGB video signals are respectively controlled by the pre-amplifier 20 and gun driver 40 which respond to the gain and bias control signals RGB_GAIN and RGB_DC_BIAS from the D/A converter 60, respectively. As a result of such gain and bias controls, there occur the changes in cathode voltages of the guns so that the color of the display apparatus can be adjusted as a user desires.

Returning to FIG. 1, the display apparatus further includes a horizontal/vertical deflection processing unit 80 for generating several deflection control signals related to horizontal and vertical deflections, such as horizontal and vertical driving signals, flyback signals, etc., and a horizontal/vertical deflection output unit 90 for supplying sawtooth wave currents to horizontal and vertical yokes (not shown) provided around the neck of the CRT 50.

Further, the display apparatus may include an OSD (on screen display) control unit (not shown). As is well known, the OSD control unit controls the gun driver 40 during an OSD period so that an OSD screen for color adjustment can be displayed on a partial area of the CRT screen. Thus, a user can see the color adjustment state through the OSD area.

Figure 3:
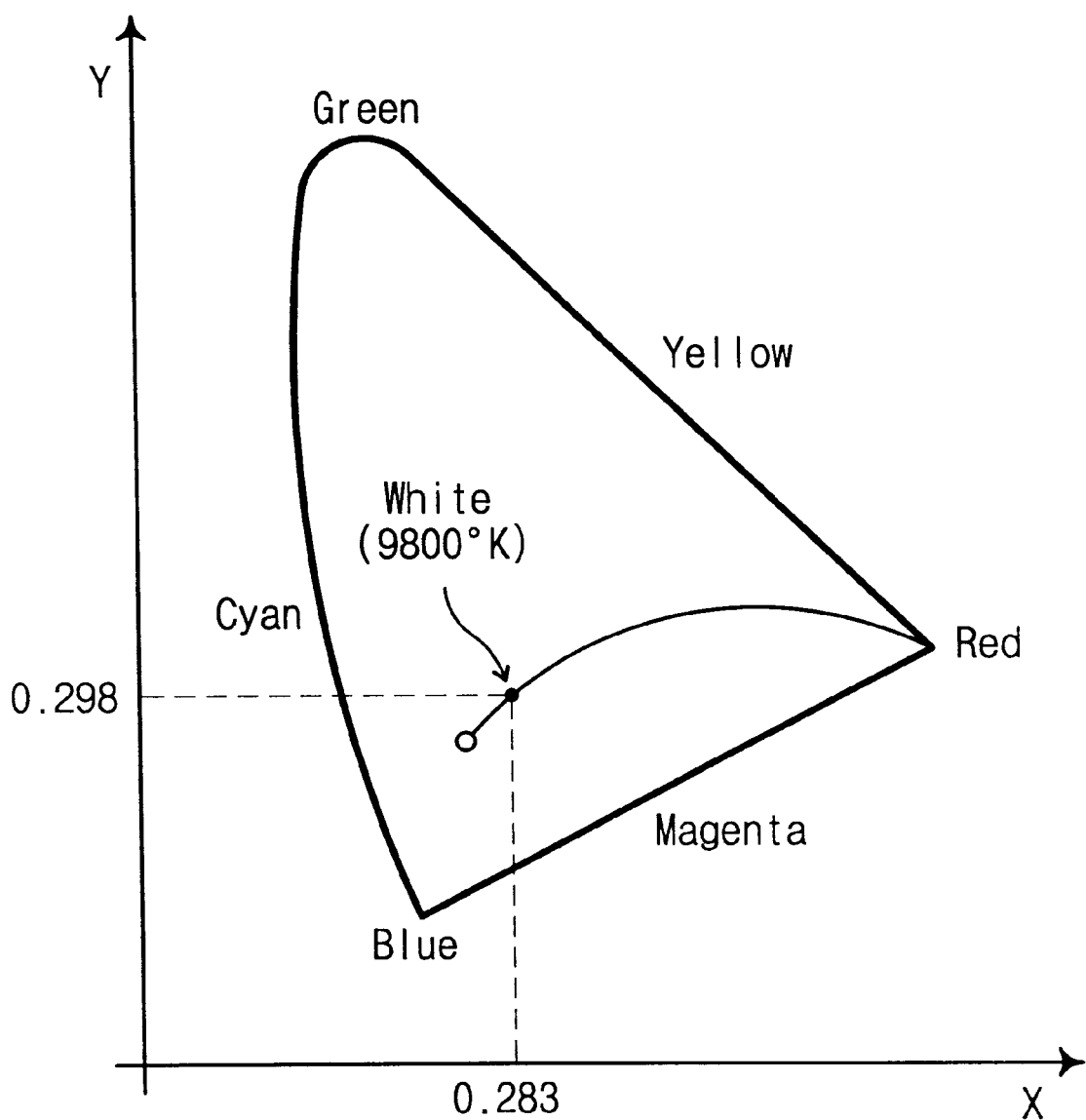
FIG. 3 is an X-Y chromaticity diagram related to the color temperature of a CRT.

Referring to FIG. 3, there is an X-Y chromaticity diagram illustrated in association with the color temperature of a CRT. For critical color matching, the color temperature of a color CRT display monitor can be an important issue. White light is not white, of course, but a mixture of all colors. All whites are not the same. Some are richer in blue, some in yellow. The different colors of white are described by their color temperature, the number of degrees Kelvin (degrees Celsius above absolute zero) that a perfect luminescent body would need to be to emit that color. The color temperature denotes the value of radiant energy applied to a specific color. In a color CRT monitor apparatus, in order to obtain a pure white, there is a necessity to adjust coordinates of white on an X-Y chromaticity coordinate system. When X and Y coordinates of white are equal to 0.283 plus or minus 0.02 and 0.298 plus or minus 0.02 respectively, then pure white is acquired. Then, the color temperature of the white is about 9800 degrees Kelvin.

Hereinafter, a method of adjusting the color of a video display apparatus in accordance with a preferred embodiment of the present invention is discussed with reference to FIG. 5 which is a program for performing the method and is executed by the microcontroller 70. In the color CRT display monitor apparatus of FIG. 1, a user can easily and variously control the color of the display apparatus by means of hue and saturation keys for color adjustment.

First, at step S100, the video display apparatus is initialized and a mean luminance value L is calculated from a maximum luminance value $MAX_L$ and a minimum luminance value $MIN_L$, as given by the following equation:

$$L = \frac{(MAX_L + MIN_L)}{2} \quad (1)$$

Flow then proceeds to step S120, wherein the microcontroller 70 detects whether any key is pressed, that is, whether there is a key input. In step 120, it is determined whether a pressed key is a hue or saturation adjustment key. If the pressed key is not either the hue or saturation key, flows proceeds to step S130. In step 130, a function corresponding to the pressed key is carried out. If the pressed key is either the hue or saturation key as determined in step S120, flow proceeds to step S140 wherein an OSD adjustment menu for color adjustment on a screen of the CRT is displayed. Thereafter, the microcontroller 70 receives hue and/or saturation data Hue and/or Sat generated in accordance with the keypress of the hue and/or saturation adjustment key, in step S150. Flow then proceeds to step S160 wherein the hue and/or saturation data Hue and/or Sat are transformed into RGB control data Red, Green and Blue by means of hue and saturation conversions. Finally, at step S170, microcontroller 70 controls the voltage levels of the RGB gain and bias control signals, which are respectively supplied to the video pre-amplifier 20 and the gun driver 40 from the D/A converter 60, on the basis of the RGB control data Red, Green and Blue.

Figure 6:
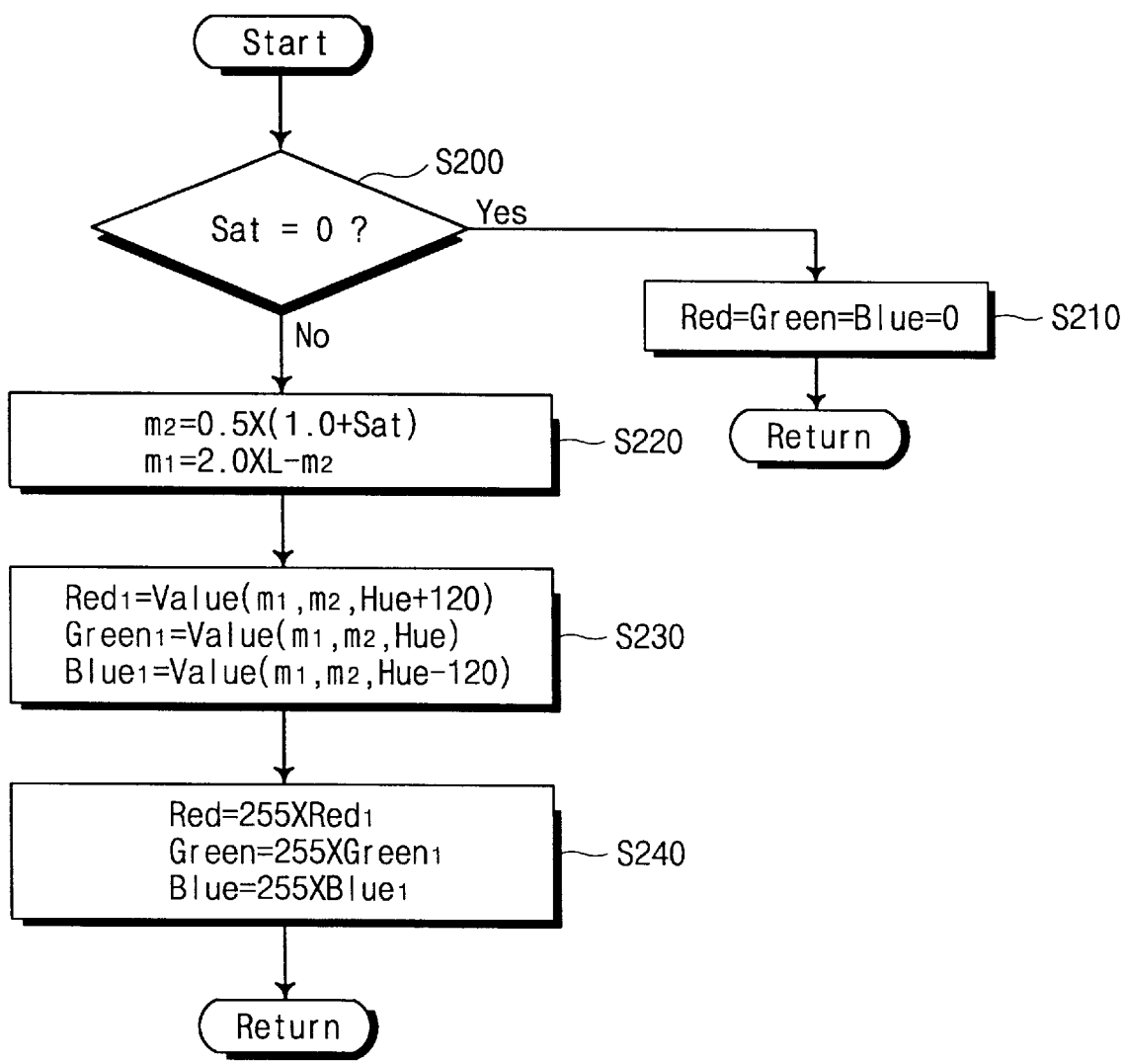
FIG. 6 is a flowchart illustrating the hue and saturation data transformation routine shown in FIG. 5.

FIG. 6 illustrates the hue and saturation data transformation routine (step S160) of FIG. 5. Referring to FIG. 6, in step S200, the value of the saturation data Sat is compared with zero (0). If the value of the saturation data Sat is equal to 0 as determined at step S200, flow proceeds to step S210 wherein each of the RGB control data Red, Green and Blue is set to 0. If not, as determined at step S200, flow proceeds to step S220. In step S220, a first parameter value $m_2$ and a second parameter value $m_1$ are calculated from the saturation data value Sat and the mean luminance value L, as given by the following equations:

$$m_2 = 0.5 \times (1.0 + Sat) \quad (2)$$

$$m_1 = 2.0 \times L - m_2 \quad (3)$$

Thereafter, flows proceeds to step S230, wherein primary RGB data values $Red_1$, $Green_1$ and $Blue_1$ by means of a given function Value ($n_1$, $n_1$, $Hue_1$) are calculated. In the function Value ($n_1$, $n_1$, $Hue_1$), the parameters $n_1$, $n_2$ and $Hue_1$ are respectively set to the parameter values $m_1$, $m_2$ and either Hue. The primary RGB data values $Red_1$, $Green_1$ and $Blue_1$ can be represented by the following equations.

$$Red_1 = Value(m_1, m_2, Hue+120) \quad (4)$$

$$Green_1 = Value(m_1, m_2, Hue) \quad (5)$$

$$Blue_1 = Value(m_1, m_2, Hue-120) \quad (6)$$

Figure 7:
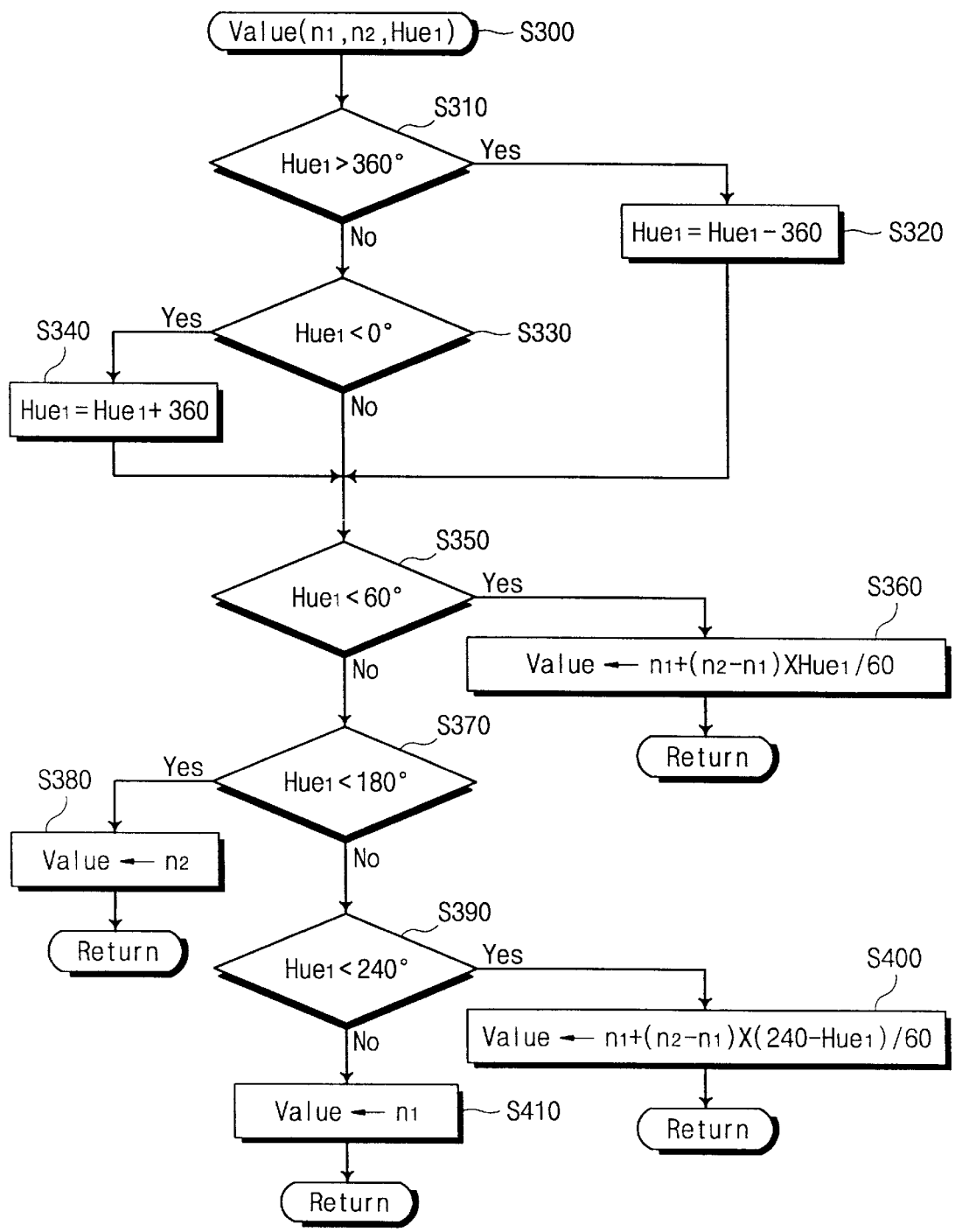
FIG. 7 is a flowchart illustrating the primary RGB data calculation routine shown in FIG. 6.

FIG. 7 is illustrates the primary RGB data calculation routine (step S230) of FIG. 6. Referring to 7, in steps S310 through S340, the parameter $Hue_1$ is set to a value in a range from 0 to 360. To put it concretely, in step S310, it is determined whether or not the parameter $Hue_1$ is greater than 360. If so, flow proceeds to step S320 wherein the parameter $Hue_1$ is set to $Hue_1-360$, and flow then proceeds to step S350. In step S310, if not, flow proceeds to step S330 wherein it is determined whether or not the parameter $Hue_1$ is less than 0. If the parameter $Hue_1$ is less than 0, the parameter $Hue_1$ is set to $Hue_1+360$ and flow also proceeds to step S350. If the parameter $Hue_1$ is not less than 0 in step S330, flow proceeds to step S350.

In step S350, the parameter $Hue_1$ is compared with 60. If the parameter $Hue_1$ is less than 60 in step S350, flow proceeds to step S360 wherein the function Value ($n_1$, $n_1$, $Hue_1$) can be given by the following equation (7), for the respective parameters $n_1$, $n_1$, and $Hue_1$.

$$Value(n_1, n_2, Hue_1) = n_1 + \frac{(n_2 - n_1) \times Hue_1}{60} \quad (7)$$

The primary RGB data values $Red_1$, $Green_1$ and $Blue_1$ obtained by the above function equation (7) are returned to step S230.

In step S350, if not, flow proceeds to step S370. In step 370, it is determined whether or not the parameter $Hue_1$ is less than 180. If the parameter $Hue_1$ is less than 180 in step S370, flow proceeds to step S380 wherein the function Value ($n_1$, $n_1$, $Hue_1$) can be set as given by the following equation:

$$Value(n_1, n_2, Hue_1) = n_2 \quad (8)$$

The primary RGB data values $Red_1$, $Green_1$ and $Blue_1$ obtained by the above function equation (8) are returned to step S230.

In step S370, if not, flow proceeds to step S390. In step S390, it is determined whether the parameter $Hue_1$ is less than 240. If the parameter $Hue_1$ is less than 240 as determined in step S390, flow proceeds to step S400 wherein the function Value ($n_1$, $n_1$, $Hue_1$) can be given by the following equations:

$$Value(n_1, n_2, Hue_1) = n_1 + \frac{(n_2 - n_1) \times (240 - Hue_1)}{60} \quad (9)$$

The primary RGB data values $Red_1$, $Green_1$ and $Blue_1$ obtained by the above function equation (9) are returned to step S230.

If the parameter $Hue_1$ is not less than 240 in step S390, flow proceeds to step S410 wherein the function Value ($n_1$, $n_1$, $Hue_1$) is given by the following equation:

$$Value(n_1, n_2, Hue_1) = n_1 \quad (10)$$

The primary RGB data values $Red_1$, $Green_1$ and $Blue_1$ obtained by the above function equation (10) are returned to step S230.

Figure 8:
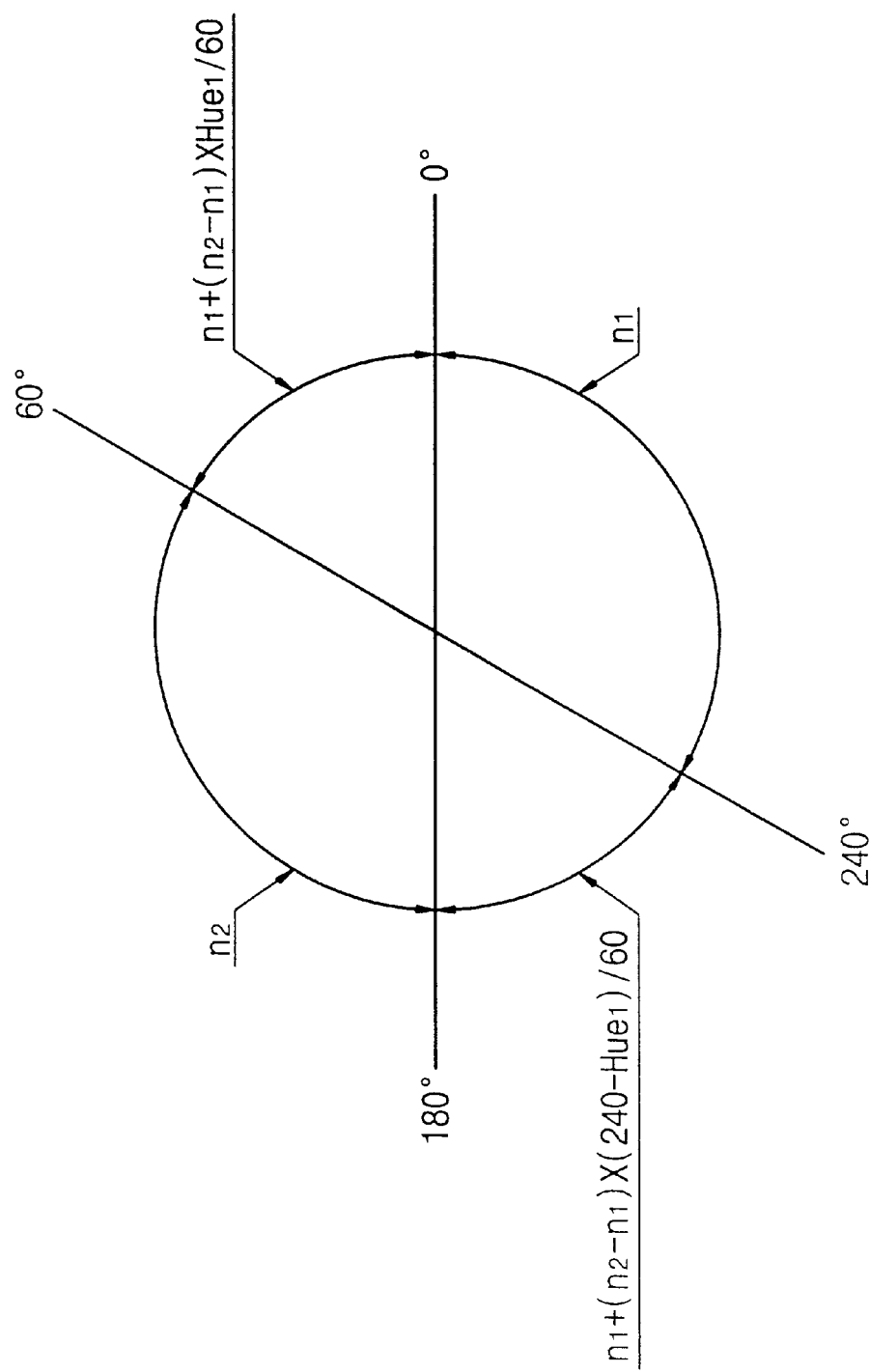
FIG. 8 is a diagram showing the variation of the primary RGB data value according to hue data value at a glance.

In FIG. 8, there are shown the variation of the primary RGB data value $Red_1$, $Green_1$ and $Blue_1$ according to hue data value. As shown in FIG. 8, the function Value ($n_1$, $n_1$, $Hue_1$) can be obtained by one of the following expressions:

$$n_1 + \frac{(n_2 - n_1) \times \text{Hue}_1}{60}, \quad \text{if } 0 < \text{Hue}_1 \leq 60 \quad (11)$$

$$n_2, \quad \text{if } 60 < \text{Hue}_1 \leq 180 \quad (12)$$

$$n_1 + \frac{(n_2 - n_1) \times (240 - \text{Hue}_1)}{60}, \quad \text{if } 0 < \text{Hue}_1 \leq 240 \quad (13)$$

$$n_1, \quad \text{if } 0 < \text{Hue}_1 \leq 360 \quad (14)$$

Referring back to FIG. 6, in step S240, the RGB control data Red, Green and Blue are set to 255×Red$_1$, 255×Green$_1$ and 255×Blue$_1$, respectively. The RGB control data Red, Green and Blue are returned to step S160 of FIG. 5. Thus, on the basis of the RGB control data Red, Green and Blue, the voltage levels of the RGB gain and bias control signals RGB_GAIN and RGB_DC_BIAS are controlled in step S170.

As described above, according to a color adjustment method of the present invention, a user can easily and variously control the color of a video display apparatus by means of hue and saturation keys for color adjustment, without a help of one skilled in the art.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of adjusting color of a video display apparatus for displaying an image by means of RGB video signals from a host, comprising the steps of:

(a) calculating a mean luminance value L from a maximum luminance value MAX$_L$ and a minimum luminance value MIN$_L$ of the display apparatus;

(b) receiving hue and saturation data Hue and Sat generated in accordance with a keypress associated with hue and saturation adjustments, wherein the saturation data Sat denotes a distance from a white point on an X-Y chromaticity coordinate system of the display apparatus to a chromaticness point on the coordinate system, and the hue data Hue denotes an angle made by a first line connecting a red point on the coordinate systems and the white point with a second line connecting the white point and the chromaticness point;

(c) transforming the hue and saturation data Hue and Sat into RGB control data Red, Green and Blue by hue and saturation conversions; and (d) controlling gains and DC biases of the RGB video signals on the basis of the RGB control data Red, Green and Blue.

2. The method according to claim 1, the step of transforming the hue and saturation data into RGB control data comprising the steps of:

determining whether a value of the saturation data Sat is zero;

setting all of the RGB control data Red, Green and Blue to zero, when the value of the saturation data Sat is found to be zero in the determining step;

calculating a first parameter value m$_2$ and a second parameter value m$_1$, from the saturation data value Sat and the mean luminance value L, where m$_2$=0.5×(1.0+Sat), m$_1$=2.0×L−m$_2$;

calculating primary RGB data values Red$_1$, Green$_1$ and Blue$_1$ using a given function Value having three parameters n$_1$, n$_2$ and Hue$_1$, wherein the parameters n$_1$, n$_2$ and Hue$_1$ are respectively set to the parameter values m$_1$, m$_2$ and either Hue or a value related thereto; and generating the RGB control data Red, Green and Blue on the basis of the primary RGB data values Red$_1$, Green$_1$ and Blue$_1$.

3. The method according to claim 2, the parameter Hue$_1$ being set to Hue+120 in association with the R control data Red, the parameter Hue$_1$ being set to Hue in association with the G control data Green, and the parameter Hue$_1$ being set to Hue−120 in association with the B control data Blue.

4. The method according to claim 3, the step of calculating the primary RGB data values Red$_1$, Green$_1$ and Blue$_1$ comprising the steps of:

setting the parameter Hue$_1$ to a value in a range from 0 to 360;

determining whether the parameter Hue$_1$ is less than 60;

setting the primary RGB data values to n$_1$+(n$_2$−n$_1$)×Hue$_1$/60 when the parameter Hue$_1$ is less than 60;

determining whether the parameter Hue$_1$ is less than 180 if the parameter Hue$_1$ is not less than 60;

setting the primary RGB data values to n$_2$ when the parameter Hue$_1$ is less than 180;

determining whether the parameter Hue$_1$ is less than 240, if the parameter Hue$_1$ is not less than 180;

setting the primary RGB data values to n$_1$+(n$_2$−n$_1$)×(240−Hue$_1$)/60 when the parameter Hue$_1$ is less than 240; and setting the primary RGB data values to n$_1$ when the parameter Hue$_1$ is not less than 240.

5. The method according to claim 4, the step of setting the parameter Hue$_1$ to a value in the range from 0 to 360 comprising the steps of:

determining whether the parameter Hue$_1$ is greater than 360;

setting the parameter Hue$_1$ to Hue$_1$−360 when the parameter Hue$_1$ is greater than 360;

determining whether the parameter Hue$_1$ is less than 0 if the parameter Hue$_1$ is not greater than 360; and setting the parameter Hue$_1$ to Hue$_1$+360 when the parameter Hue$_1$ is less than 0.

6. The method according to claim 2, the step of generating the RGB control data Red, Green and Blue comprising the step of setting the RGB control data Red, Green and Blue to C×Red$_1$, C×Green$_1$ and C×Blue$_1$, respectively, where C is a predetermined constant.

7. A method of adjusting color of a video display apparatus method comprising the steps of:

(a) initializing a video display apparatus; having a cathode ray tube (CRT), keys for several adjustment functions thereof, a video pre-amplifier for amplifying RGB video signals from a host on the basis of voltage levels of RGB gain control signals, a video main amplifier for amplifying output signals of the video pre-amplifier, a gun driver for receiving output signals of the video main amplifier and controlling DC levels of the received signals on the basis of voltage levels of RGB bias control signals so as to generate RGB driving signals which drive RGB electron guns of the cathode ray tube, respectively, and a microcontroller for controlling the voltage levels of the RGB gain and bias control signals on the basis of key-input data generated when the keys are pressed;

(b) detecting a keypress;

(c) determining whether a pressed key is a hue/saturation adjustment key;

(d) performing a function corresponding to the pressed key when the pressed key is found not to be the hue/saturation adjustment key;

(e) displaying a menu for color adjustment on a screen of the CRT when the pressed key is found to be the hue/saturation adjustment key;

(f) receiving hue and saturation data Hue and Sat generated in accordance with the keypress of the hue/saturation adjustment key;

(g) transforming the hue and saturation data Hue and Sat into RGB control data Red, Green and Blue using hue and saturation conversions; and (h) controlling the voltage levels of the RGB gain and bias control signals on the basis of the RGB control data Red, Green and Blue.

8. The method according to claim 7, the saturation data saturation data denoting a distance from a white point on an X-Y chromaticity coordinate system of the CRT to a chromaticness point on the chromaticity coordinate system, and the hue data Hue denoting an angle made by a first line connecting a red point on the coordinate system and the white point with a second line connecting the white point and the chromaticness point.

9. The method according to claim 8, the step (a) of initializing the video display apparatus further comprising the step of calculating a mean luminance value L from a maximum luminance value $MAX_L$ and a minimum luminance value $MIN_L$.

10. The method according to claim 9, the step (g) of transforming the hue and saturation data into RGB control data comprising the steps of:

determining whether a value of the saturation data saturation data is zero;

setting, all of the RGB control data Red, Green and Blue to zero if the value of the saturation data saturation data is zero;

calculating a first parameter value $m_2$ and a second parameter value $m_1$, from the saturation data value saturation data and the mean luminance value L, where $m_2=0.5\times(1.0+\text{value of saturation data})$, $m_1=2.0\times L-m_2$;

calculating primary RGB data values $Red_1$, $Green_1$ and $Blue_1$ by means of a given function Value having three parameters $n_1$, $n_2$ and $Hue_1$, wherein the parameters $n_1$, $n_2$ and $Hue_1$ are respectively set to the parameter values $m_1$, $m_2$ and either Hue or a value related thereto; and generating the RGB control data Red, Green and Blue on the basis of the primary RGB data values $Red_1$, $Green_1$ and $Blue_1$.

11. The method according to claim 10, the parameter $Hue_1$ being set to Hue+120 in association with the R control data Red, the parameter $Hue_1$ being set to Hue in association with the G control data Green, and the parameter $Hue_1$ being set to Hue−120 in association with the B control data Blue.

12. The method according to claim 11, the step of calculating the primary RGB data values $Red_1$, $Green_1$ and $Blue_1$ comprising the steps of:

setting the parameter $Hue_1$ to a value in a range from 0 to 360;

determining whether the parameter $Hue_1$ is less than 60;

setting the primary RGB data values to $n_1+(n_2-n_1)\times Hue_1/60$ when the parameter $Hue_1$ is less than 60;

determining whether the parameter $Hue_1$ is less than 180 when the parameter $Hue_1$ is not less than 60;

setting the primary RGB data values to $n_2$ when the parameter $Hue_1$ is less than 180;

determining whether the parameter $Hue_1$ is less than 240, if the parameter $Hue_1$ is not less than 180;

setting the primary RGB data values to $n_1+(n_2-n_1)\times(240-Hue_1)/60$ when the parameter $Hue_1$ is less than 240; and setting the primary RGB data values to $n_1$ when the parameter $Hue_1$ is not less than 240.

13. The method according to claim 12, the step of setting the parameter $Hue_1$ to a value in the range from 0 to 360 comprising the steps of:

determining whether the parameter $Hue_1$ is greater than 360;

setting the parameter $Hue_1$ to $Hue_1-360$ when the parameter $Hue_1$ is greater than 360;

determining whether the parameter $Hue_1$ is less than 0 when the parameter $Hue_1$ is not greater than 360; and setting the parameter $Hue_1$ to $Hue_1+360$ when the parameter $Hue_1$ is less than 0.

14. The method according to claim 10, the step of generating the RGB control data Red, Green and Blue comprising the step of setting the RGB control data Red, Green and Blue to $C \cdot Red_1$, $C \cdot Green_1$ and $C \cdot Blue_1$, respectively, where C is a predetermined constant.

* * * * *